United States Patent
Chandran et al.

(10) Patent No.: US 11,983,750 B1
(45) Date of Patent: May 14, 2024

(54) RISKY ITEM PAGE DETECTION

(71) Applicant: Amazon Technologies, Inc., Seattle, WA (US)

(72) Inventors: Aparajith Chandran, Seattle, WA (US); Igor Grudetskyi, Seattle, WA (US); Omar Sarr, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 191 days.

(21) Appl. No.: 17/409,672

(22) Filed: Aug. 23, 2021

(51) Int. Cl.
*G06Q 30/00* (2023.01)
*G06F 16/9535* (2019.01)
*G06F 16/9538* (2019.01)
*G06N 20/00* (2019.01)
*G06Q 30/0601* (2023.01)

(52) U.S. Cl.
CPC ..... *G06Q 30/0607* (2013.01); *G06F 16/9535* (2019.01); *G06F 16/9538* (2019.01); *G06N 20/00* (2019.01); *G06Q 30/0641* (2013.01)

(58) Field of Classification Search
CPC ............... G06Q 30/0607; G06Q 30/0641
See application file for complete search history.

(56) References Cited

U.S. PATENT DOCUMENTS

| | | | |
|---|---|---|---|
| 2010/0094887 A1* | 4/2010 | Ye | H04L 51/212 |
| | | | 707/E17.014 |
| 2019/0258827 A1* | 8/2019 | Kaladgi | G06F 21/64 |
| 2020/0234306 A1* | 7/2020 | Turgeman | G06Q 20/321 |
| 2021/0097178 A1* | 4/2021 | Bottaro | G06F 16/24575 |
| 2021/0224885 A1* | 7/2021 | Yarra | G06Q 30/0643 |

OTHER PUBLICATIONS

Grazioli, Stefano, and Sirkka L. Jarvenpaa. "Perils of Internet fraud: An empirical investigation of deception and trust with experienced Internet consumers." IEEE Transactions on Systems, Man, and Cybernetics—Part A: Systems and Humans 30.4 (2000): 395-410.*

* cited by examiner

*Primary Examiner* — Kathleen Palavecino
(74) *Attorney, Agent, or Firm* — Athorus, PLLC

(57) ABSTRACT

Disclosed are systems and methods that determine a likelihood that an item page represents a risky item. For example, a machine learning model may be trained to determine a probability score that an item page corresponds to a topic of a plurality of topics based on item textual descriptions determined from the item page and search queries corresponding to the item page. Still further, one or more of a topic risk score, item risk score, cumulative item risk score, and/or a total item risk score may be determined. Each of the risk scores may be indicative of a likelihood that the item page represents a risky item.

13 Claims, 7 Drawing Sheets

RISKY ITEM PAGE DETECTION

BACKGROUND

As more and more items are being sold through electronic-commerce ("e-commerce") channels there has been a similar increase in entities that are selling risky items through those e-commerce channels. For example, some items, such as weapons, pesticides, hazardous items, chemicals, alcohol, etc., may be regulated by one or more government entities and the sale of those products may likewise be regulated and, in some instances, prohibited through some or all e-commerce channels. Existing systems attempt to identify and remove item pages for risky items based on keywords present in the item pages. However, some sellers have discovered ways to avoid detection by not utilizing particular keywords on the item pages so that the item pages for risky items are not detected and removed.

DETAILED DESCRIPTION

Disclosed are systems and methods to determine a likelihood that an item page represents a risky item. As discussed further below, a machine learning model may be trained to determine a probability score that an item page corresponds to a topic of a plurality of topics based on item textual descriptions determined from the item page and search queries corresponding to the item page. Still further, an item risk score for the item page may be computed based on the probability score and topic risk scores for the topics. Likewise, a cumulative item risk score may be computed as, for example, a sum of the item risk score determined for each topic and a total item risk score may be computed based on the item risk score and the cumulative item risk score. Each of the risk scores may be indicative of a likelihood that the item page represents a risky item.

A risky item, as used herein, refers to any item for which sale through a channel, such as an electronic commerce ("e-commerce") channel is to be encumbered (e.g., restricted, prohibited, or otherwise regulated). For example, a risky item may be any one or more of a prohibited item, such as items that are illegal, illegally marketed, unsafe, offensive, or in violation of the e-commerce channel's policies; a restricted item, such as items sold subject to certain conditions, such as geographic restrictions (e.g., pepper spray may be restricted for sale in only certain jurisdictions); domestically regulated items, such as items that must meet certain regulatory requirements to be sold; etc.

Figure 1A:
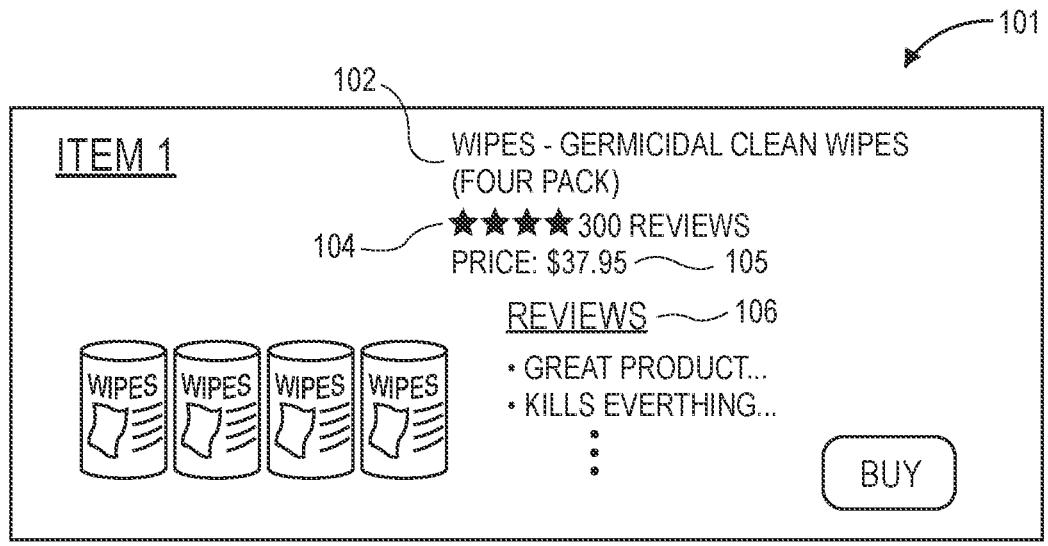
FIGS. 1A and 1B are example illustrations of risky item pages that are detectable using the disclosed implementations.
Figure 1B:
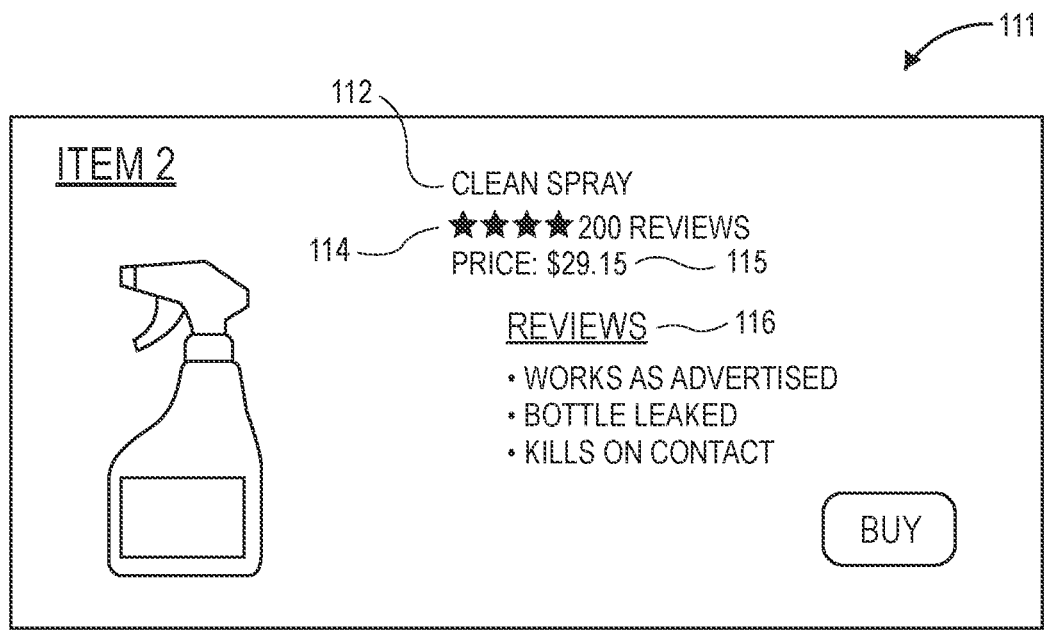

FIGS. 1A and 1B are example illustrations of item pages that correspond to risky items that would not be detectable using traditional techniques, but are detectable through use of the current implementations. Turning first to FIG. 1A, the item page 101 is crafted with a title 102, "Wipes—Germicidal Clean Wipes (Four Pack)," has a four star rating 104, a price 105 of $37.95, and reviews 106. Referring to FIG. 1B, the item page 111 is crafted with a title 112, "Clean Spray," has a four star rating 114, a price 115 of $29.15, and reviews 116. For both item pages 101 and 111, because the title does not include any keywords that would indicate that the item is a risky item, in these examples chemicals, traditional techniques would likely not identify the item page 101/111 as corresponding to a risky item. However, with the disclosed implementations, which consider additional information such as keywords from user reviews 106/116, search terms included in user submitted queries that resulted in the item pages being returned as responsive to the queries, etc., will identify the item pages 101/111 as corresponding to risky items.

Figure 2:
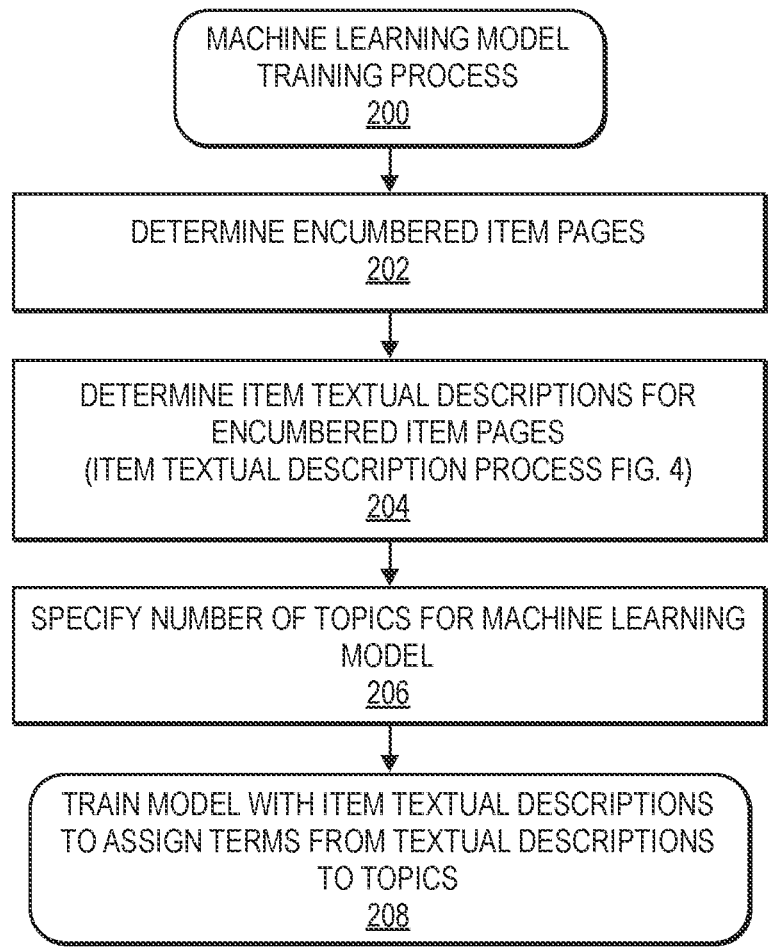
FIG. 2 is an example machine learning model training process, in accordance with disclosed implementations.

FIG. 2 is an example machine learning model training process 200, in accordance with disclosed implementations.

The example process 200 begins by determining a plurality of encumbered item pages corresponding to risky items that have previously been identified, as in 202. Existing encumbered item pages may be manually identified, synthetically created, identified in accordance with the disclosed implementations, etc.

Item textual descriptions for each of the encumbered item pages are then determined for each of the plurality of encumbered item pages, as in 204. Determination of item textual descriptions is discussed further below with respect to FIG. 4.

In addition, a number of topics for the machine learning model are also determined, as in 206. In some implementations, the number of topics for the machine learning model may be specified manually. In other implementations, the number of topics may be determined as part of the training process. For example, the number of topics may be determined based on a topic coherence value that is indicative of semantic similarity between high scoring words in a topic. In one example, the topic coherence value may be determined for different numbers of topics and the number of topics for the machine learning model selected as the number at which the topic coherence value stops significantly increasing when more topics are added. Likewise, a Latent Dirichlet Allocation algorithm may be utilized that determines, through analysis of the item textual descriptions, the topics and introduces a hidden layer in the machine learning model corresponding to those topics.

Finally, the machine learning model is trained using the item textual descriptions to assign terms from the item textual descriptions to the different topics determined for the machine learning model, as in 208. In some implementations, the terms may be further supplemented with additional terms that are known to be relevant to the topic.

Training of the machine learning model may be through unsupervised learning, using unlabeled data. In other implementations, labeled data and supervised learning may be used to train the machine learning model. Training of the machine learning model may continue indefinitely and/or periodically as updates are needed.

Figure 3:
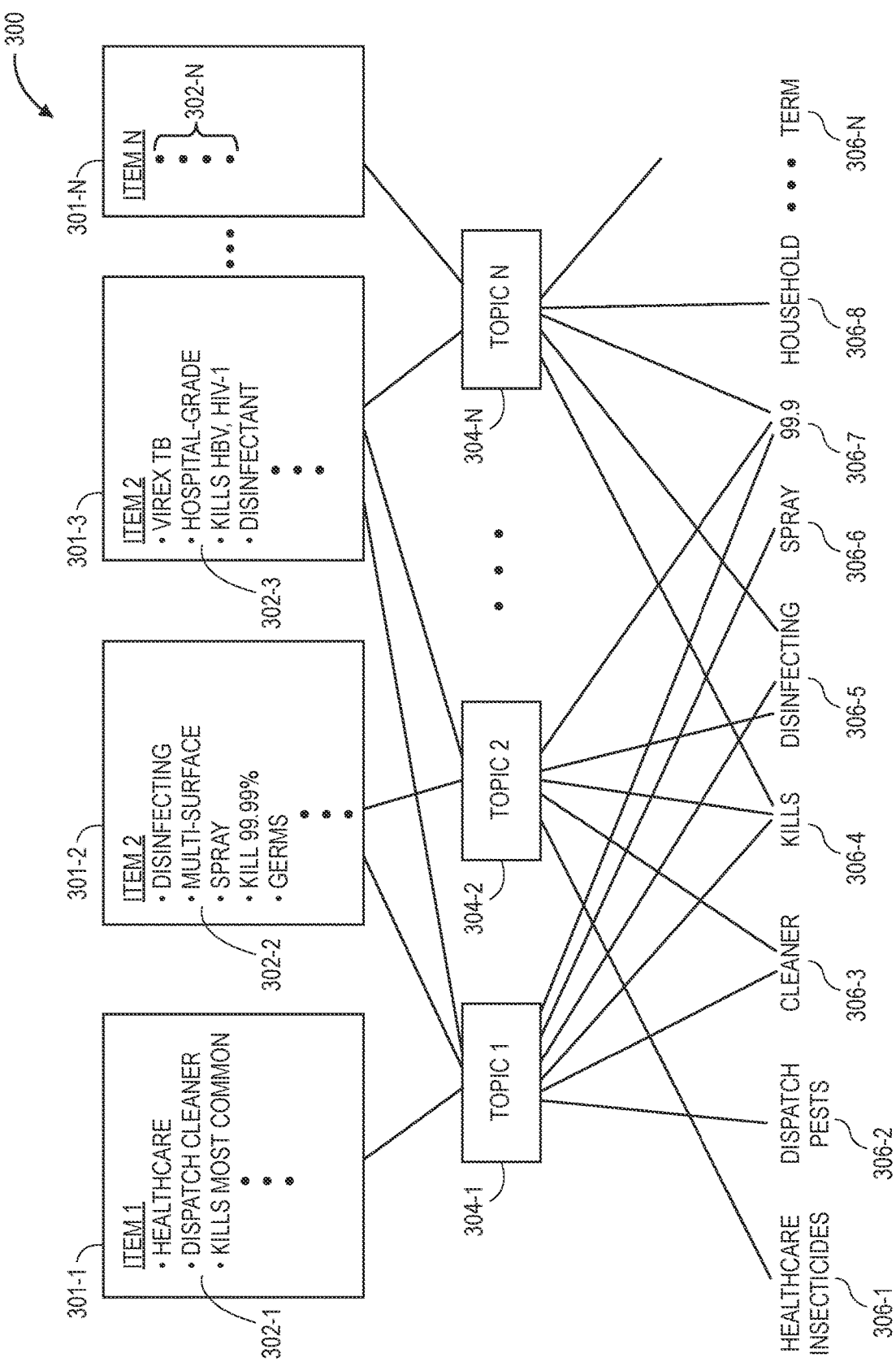
FIG. 3 is an example illustration of clusters generated through training of an example machine learning model, in accordance with disclosed implementations.

FIG. 3 is an example illustration of clusters 300 generated through training of an example machine learning model, in accordance with disclosed implementations.

As illustrated, item textual descriptions 302-1, 302-2, 302-3, through 302-N, which, as discussed below with respect to FIG. 4 may be determined from the item page and/or from search terms included in user queries that result in the item page being returned as responsive to the query, are determined for a plurality of risky items 301-1, 301-2, 301-3, through 301-N. A number of topics, 304-1, 304-2, through 304-N are determined based at least in part on the encumbered item pages 301-1 through 301-N and/or item textual descriptions 302-1 through 302-N. Terms 306-1, 306-2, 306-3, 306-4, 306-5, 306-6, 306-7, 306-8 through 306-N, determined from the item textual descriptions 302-1 through 302-N, are associated with the different topics 304-1 through 304-N.

For example, item textual description 302-1 for item 1 301-1 and the item textual description 302-2 for item 2 301-2 may be associated with topic 1 304-1 such that topic 1 includes terms of dispatch pests 306-2, cleaner 306-3, kills 306-4, disinfecting 306-5, spray 306-6, and 99.9 306-7. As another example, the item textual description 302-2 of item 2 301-2 may also be used to generate terms for topic 2 304-2. Likewise, item textual description 302-3 for item 3 301-3 may be used by each of topic 1 304-1, topic 2 304-2, through topic N 304-N to generate terms 306 that are associated with those topics. As illustrated, terms 306-1 through 306-N may be associated with one or more topics 304-1 through 304-N. In other implementations, a term may only be associated with a single topic.

Figure 4:
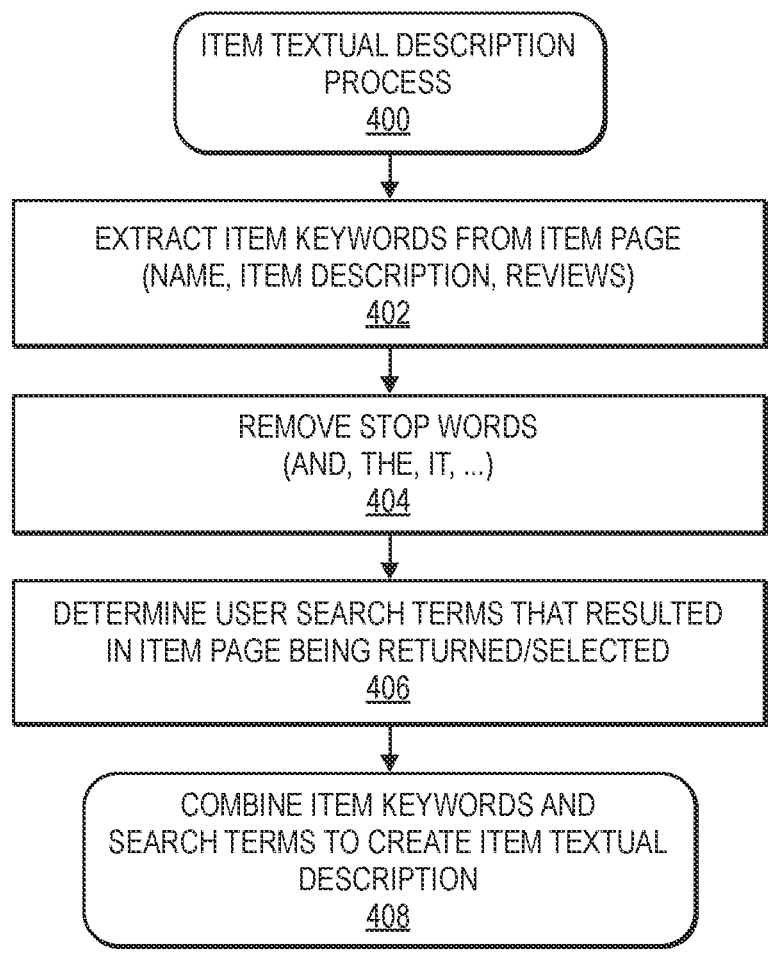
FIG. 4 is an example item textual description process, in accordance with disclosed implementations.

FIG. 4 is an example item textual description process 400, in accordance with disclosed implementations.

The example process 400 begins by extracting item keywords from an item page, as in 402. Keywords may be any words included in or associated with an item page and may include, but are not limited to, the title, user submitted reviews, item descriptions, price, etc. For example, referring again to FIG. 1A, keywords from item 1 101 may include, but are not limited to, wipes, germicidal, clean, kills, everything, etc.

The example process 400 may remove stop words from the keywords, as in 404. Stop words may be identified in a dictionary or otherwise determined (e.g., based on the frequency of the words). Example stop words include, but are not limited to, "a," "and," "the," "it," "price," etc.

In addition to determining keywords from the item page, user search terms that were submitted as part of a query that resulted in the item page being returned and/or selected as responsive to the query are also determined, as in 406. In some implementations, search terms may be determined for any query in which the item page was returned as responsive to the query. In other implementations, search terms may only be returned for queries in which the item page was returned and ultimately selected by the user.

For example, if a user inputs search terms "antibacterial wipes" and the results of the query include the item page 101 (FIG. 1A) as responsive to the query, the search terms that are included in the item textual description may include one or both of "antibacterial" and/or "wipes."

Finally, the item keywords and search terms, without the stop words, may be combined to create the item textual description, as in 408.

Figure 5:
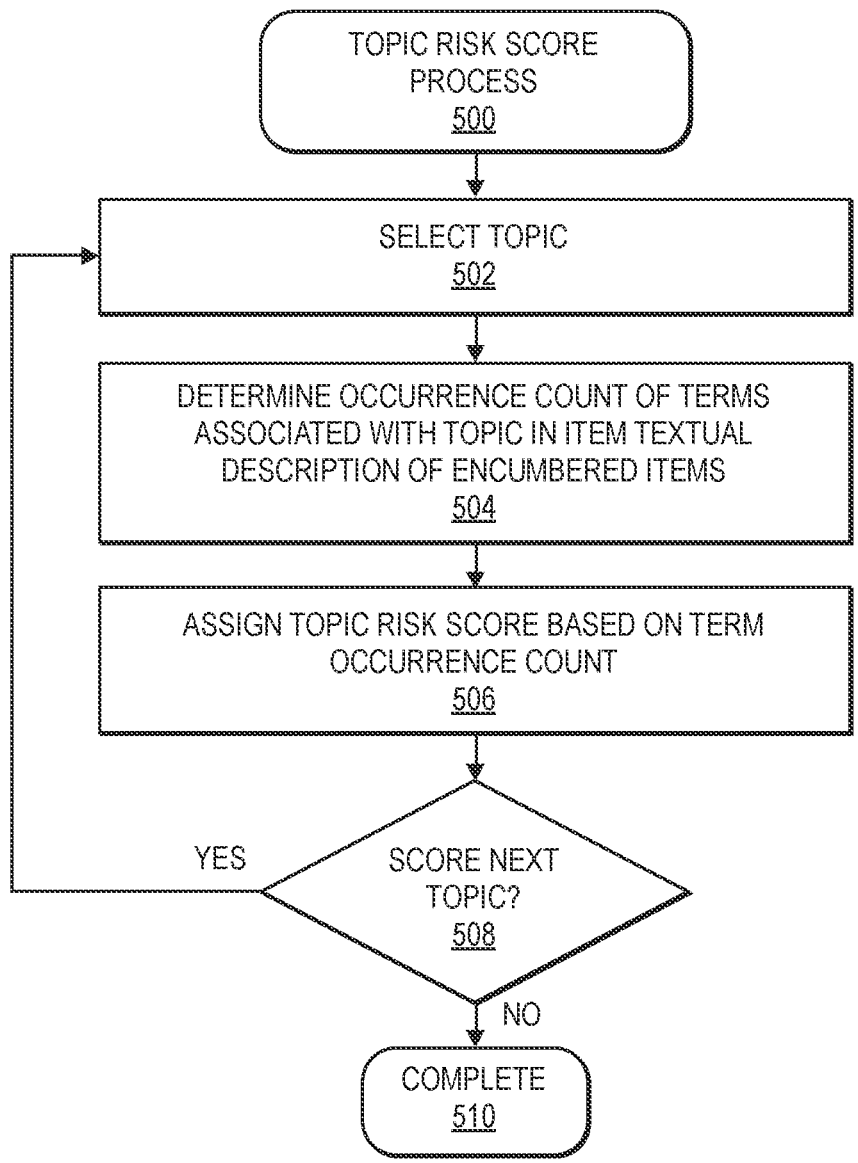
FIG. 5 is an example topic risk score process, in accordance with disclosed implementations.

FIG. 5 is an example topic risk score process 500, in accordance with disclosed implementations. The topic risk score process 500 may be performed during or concurrent with training of the machine learning model to determine a topic risk score for each determined topic. The resultant topic risk scores may then be used with the disclosed implementations, as discussed further below, as part of the item risk score determination process. In some examples, the topic risk scores for topics may be recomputed if training of the machine learning model is updated.

The example process 500 begins by selecting a topic for which a topic risk score is to be determined, as in 502. For the selected topic, an occurrence count of terms associated with the topic that appear in the item textual description (keywords and/or search terms) of one or more encumbered item pages is determined, as in 504. In some implementations, based on the occurrence of the terms in the encumbered item pages, a score is assigned to each term, as in 506. For example, a risk score between 1 and 10 may be assigned to each term of the topic based on the occurrence count of the term in the item textual description of each encumbered item page. The topic risk score may then be computed as the product of the probabilistic distribution of the terms weighted against the risk score of the terms.

A determination is then made as to whether an additional topic is to be scored by the example process 500, as in 508. If it is determined that an additional topic is to be scored, the example process 500 returns to block 502 and continues. If it is determined that additional topic scores are not to be determined, the example process 500 completes, as in 510.

Figure 6:
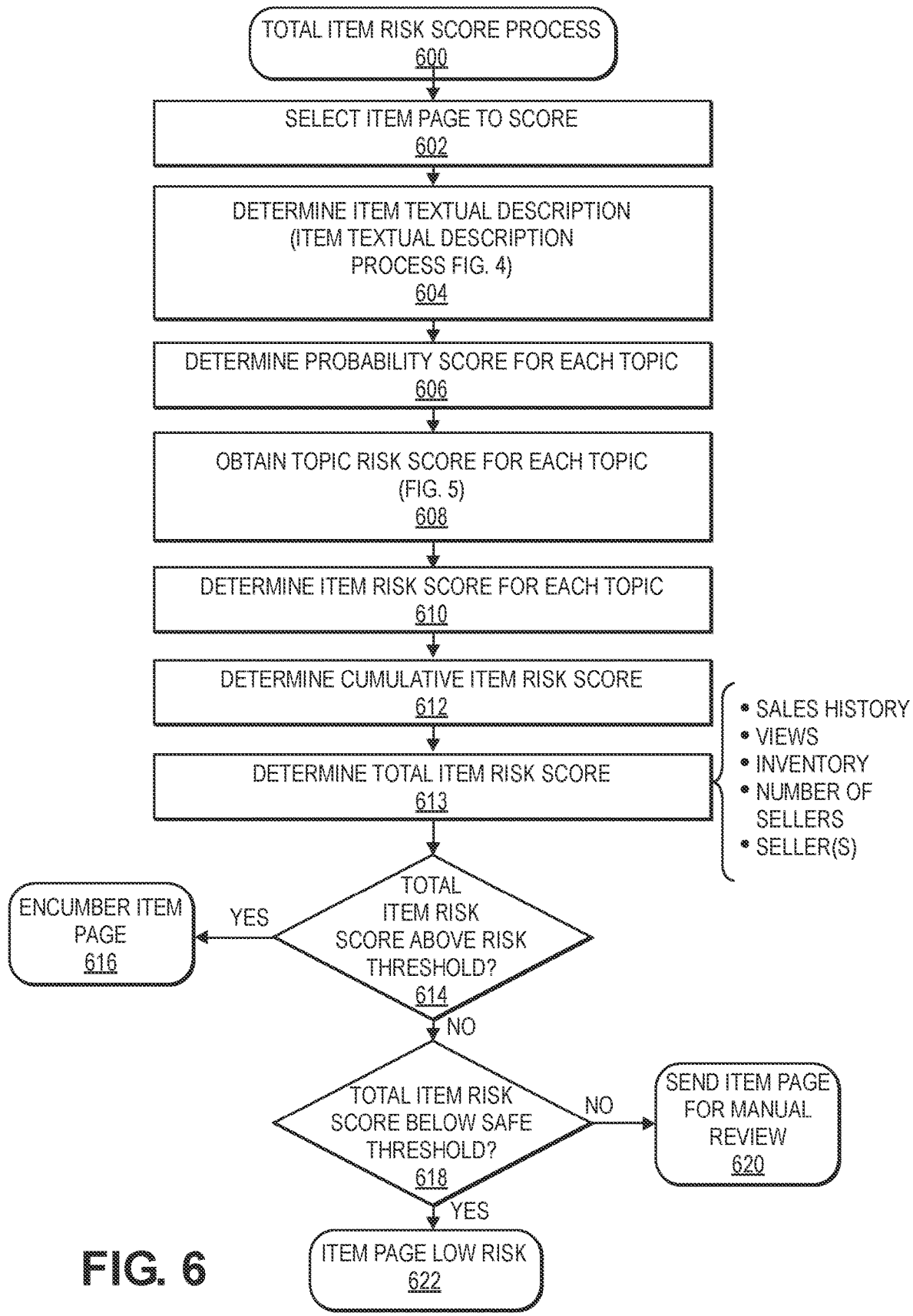
FIG. 6 is an example total item risk score process, in accordance with disclosed implementations.

FIG. 6 is an example total item risk score process 600, in accordance with disclosed implementations.

The example process 600, which may be performed at any time after training of the machine learning model, as discussed above, begins by selecting an item page to score, as in 602. Selection of an item page to score may be done periodically or on demand. For example, in some implementations, the example process 600 may be performed daily, weekly, monthly, or on another periodic basis and item pages that have not been previously scored or that have not been scored a defined number of times processed. For example, in some implementations, an item page may be re-scored a defined number of times, each time the item page is returned as responsive to a query, etc. In other implementations, if the item page has been scored a defined number of times or otherwise indicated as having a low risk of corresponding to a risky item, the item page may be omitted from the example process 600. In other implementations, the example process 600 may be performed on-demand. For example, each time an item page is returned as responsive to a query, or each time an item page is returned a defined number of times as responsive to a query (e.g., 10 times), the example process 600 may be performed with respect to that item page.

For the selected item page, item textual descriptions are determined, as in 604. Determination of item textual descriptions for an item page is discussed above with respect to the example process 400 (FIG. 4).

Based on the item textual descriptions determined for the selected item page, a probability score is determined for each topic, the probability score indicative of a probability that the item page corresponds to the topic, as in 606. For example, the trained machine learning model may process the item textual descriptions for the item page with respect to the terms associated with each topic and compute respective probability scores for each topic. Referring back to the item page 101 of FIG. 1A, the example process 600 may determine a probability score of 80% that the item page 101 corresponds to a first topic (Topic 1) and a probability score of 20% that the item page 101 corresponds to a second topic (Topic 2). As another example, the example process 600 may determine a probability score of 70% that the item page 111 (FIG. 1B) corresponds to Topic 1, a probability score of 10% that the item page 111 corresponds to Topic 2, a probability score of 10% that the item page 111 corresponds to a third topic (Topic 3), a probability score of 5% that the item page 111 corresponds to a fourth topic (Topic 4), and a probability score of 5% that the item page 111 corresponds to a fifth topic (Topic 5). The example process 600 may determine a probability score for each topic defined for the machine learning model and in some instances the probability score for a topic may be zero, or near zero.

In addition, the topic risk score for each topic may be obtained, as in 608. Determination of topic risk scores for each topic, which may be performed during training of the machine learning model, is discussed above with respect to example process 500 (FIG. 5).

In addition to determining a topic risk score for each topic, an item risk score for the item, with respect to each topic, is determined, as in 610. For example, in some implementations, the item risk score for each topic may be computed as a product of the probability score determined for the topic and the topic risk score associated with the topic.

In addition to determining an item risk score for the item page for each topic, in some implementations, a cumulative item risk score may also be determined, as in 612. For example, the cumulative item risk score may be the sum of each item risk score determined for each topic.

Finally, a total item risk score may be computed, as in 613. For example, the total item risk score may be computed as a combination (e.g., sum, median, mean) of a highest item risk score and the cumulative item risk score. In some implementations, other factors may also be utilized in determining the total item risk score. For example, and without limitation, one or more of a sales history of the item represented by the item page, view of the item page, a quantity of inventory of the item, a number of sellers of the item, an identity of one or more of the sellers of the item, etc., may be considered and the total item risk score increased or decreased based on those other factors.

The following Table 1 provides an illustration of the probability score, item risk score, and cumulative item risk score for an item page:

TABLE 1

| Topic | Probability Score | Item | Topic Risk Score | Item Risk Score | Cumulative Item Risk Score |
|---|---|---|---|---|---|
| 16 | 0.72 | Item A | 9.35 | 6.72 | 7.60 |
| 18 | 0.015 | Item A | 8.50 | 0.13 | 7.60 |
| 2 | 0.015 | Item A | 8.12 | 0.12 | 7.60 |
| 4 | 0.015 | Item A | 8.05 | 0.12 | 7.60 |
| 11 | 0.015 | Item A | 7.24 | 0.11 | 7.60 |
| 1 | 0.015 | Item A | 6.58 | 0.11 | 7.60 |
| 15 | 0.015 | Item A | 6.40 | 0.10 | 7.60 |
| 0 | 0.015 | Item A | 2.06 | 0.09 | 7.60 |
| 8 | 0.015 | Item A | 1.00 | 0.03 | 7.60 |
| 14 | 0.015 | Item A | 1.00 | 0.01 | 7.60 |
| 10 | 0.015 | Item A | 1.00 | 0.01 | 7.60 |
| 9 | 0.015 | Item A | 1.00 | 0.01 | 7.60 |
| 6 | 0.015 | Item A | 1.00 | 0.01 | 7.60 |
| 7 | 0.015 | Item A | 1.00 | 0.01 | 7.60 |
| 17 | 0.015 | Item A | 1.00 | 0.01 | 7.60 |
| 5 | 0.015 | Item A | 1.00 | 0.01 | 7.60 |
| 3 | 0.015 | Item A | 1.00 | 0.01 | 7.60 |
| 13 | 0.015 | Item A | 1.00 | 0.01 | 7.60 |
| 12 | 0.015 | Item A | 1.00 | 0.01 | 7.60 |
| 19 | 0.015 | Item A | 1.00 | 0.01 | 7.60 |

A determination may then be made as to whether the total item risk score exceeds a risk threshold, as in 614. The risk threshold may be any score or indicator indicative of a risk of an item page corresponding to a risky item. The risk threshold may be different for different types of risky items, different channels (e.g., different e-commerce channels), different scores, etc. Likewise, while the illustrated example is based on whether the total item risk score exceeds a risk threshold, in other implementations it may be determined whether the cumulative item risk score exceeds a risk threshold, whether a highest item risk score exceeds a threshold, whether a highest topic risk score exceeds a threshold, and/or some combination thereof.

If it is determined that the total item risk score (the cumulative item risk score, the item risk score, or the topic risk score, in other implementations) exceeds the risk threshold, the item page is encumbered, as in 616. As discussed above, encumbering of an item page may include removal of the item page from the channel and/or otherwise limiting the ability to purchase the item through the item page.

If it is determined that the total item risk score does not exceed the threshold, a determination may be made as to whether the total item risk score is below a safe threshold, as in 618. Similar to the risk threshold, the safe threshold may be any value or indicator indicative of the item page having a low likelihood of corresponding to a risky item.

If it is determined that the total item risk score is not below the safe threshold, the item page may be sent for manual review, as in 620. Manual review may include a review by one or more individuals to determine if the item page corresponds to a risky item. In comparison, if it is determined that the total item risk score is below the safe threshold, it is determined that the item page does not correspond to a risky item and the item page is allowed to remain on the channel unencumbered, as in 622.

Figure 7:
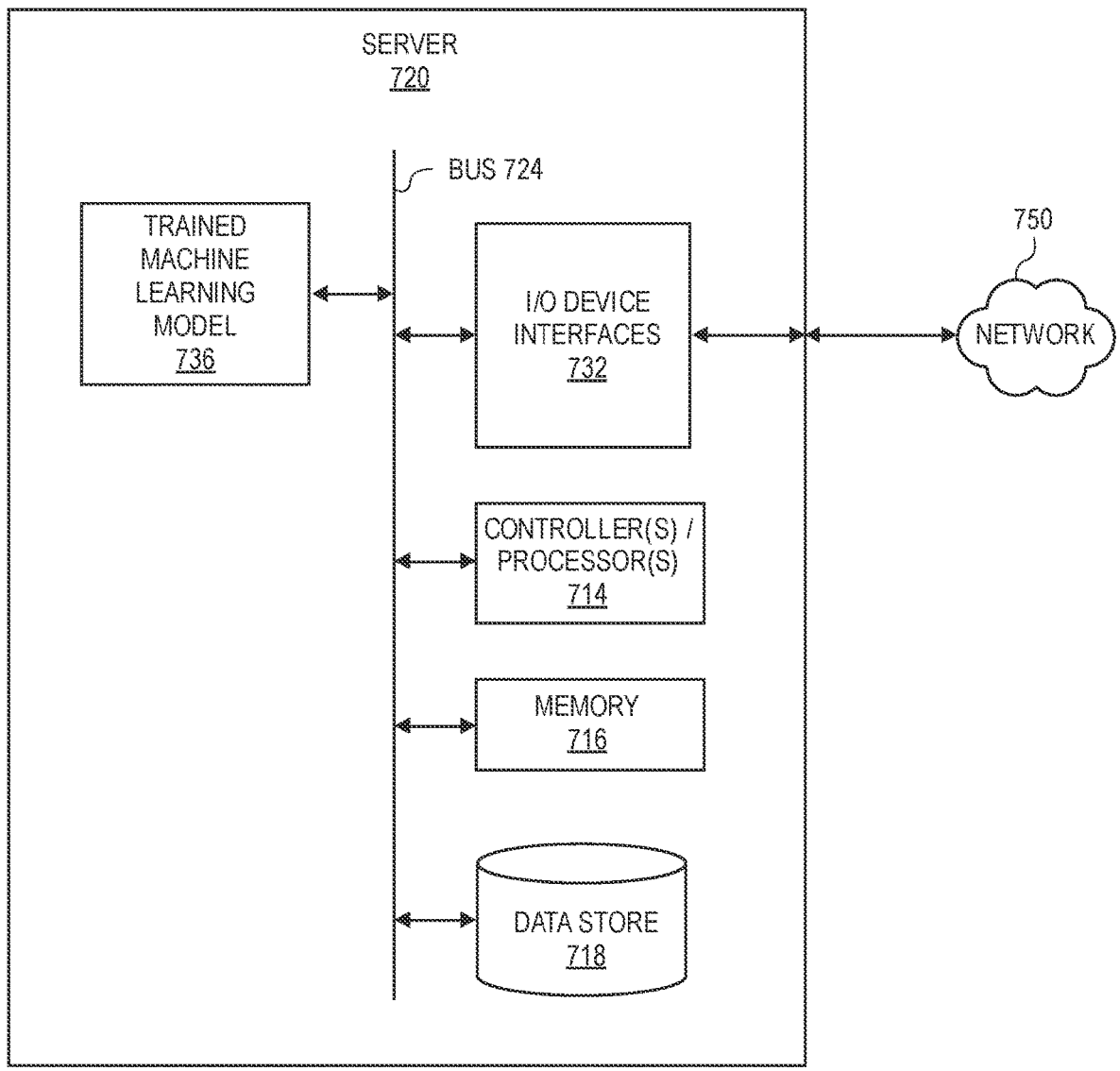
FIG. 7 illustrates example components of a server, in accordance with disclosed implementations.

FIG. 7 is a block diagram conceptually illustrating example components of a remote computing device, such as a remote server 720 that may include and/or execute one or more of the above discussed implementations. Multiple such servers 720 may be included in the system.

Each of these server(s) 720 may include one or more controllers/processors 714, that may each include a central processing unit (CPU) for processing data and computer-readable instructions, and a memory 716 for storing data and instructions. The memory 716 may individually include volatile random access memory (RAM), non-volatile read only memory (ROM), non-volatile magnetoresistive (MRAM), non-transitory computer readable memory, and/or other types of memory. Each server may also include a data storage component 718, for storing data, controller/processor-executable instructions, training data, labels, etc. Each data storage component may individually include one or more non-volatile storage types such as magnetic storage, optical storage, solid-state storage, etc. Each server may also be connected to removable or external non-volatile memory and/or storage (such as a removable memory card, memory key drive, networked storage, etc.), internal, and/or external networks 750 (e.g., the Internet) through respective input/output device interfaces 732.

Computer instructions for operating each server 720 and its various components may be executed by the respective server's controller(s)/processor(s) 714, using the memory 716 as temporary "working" storage at runtime. A server's computer instructions may be stored in a non-transitory manner in non-volatile memory 716, storage 718, and/or an external device(s). Alternatively, some or all of the executable instructions may be embedded in hardware or firmware on the respective device in addition to or instead of software.

Each server 720 includes input/output device interfaces 732. A variety of components may be connected through the input/output device interfaces. Additionally, each server 720 may include an address/data bus 724 for conveying data among components of the respective server. Each component within a server 720 may also be directly connected to other components in addition to (or instead of) being connected to other components across the bus 724. Each server may also include one or more trained machine learning models 736, as discussed herein.

The components of the server(s) 720, as illustrated in FIG. 7, are exemplary, and may be located as a stand-alone device or may be included, in whole or in part, as a component of a larger device or system.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 2, and 4-6, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, non-transitory computer readable memory, hard drive, solid-state memory, flash drive, removable disk, and/or other media. In addition, components of one or more of the modules and engines may be implemented in firmware or hardware.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    determining a plurality of keywords present in at least one of a plurality of encumbered item pages of an electronic commerce ("e-commerce") channel that have previously been removed from the e-commerce channel as representative of an item that is prohibited from sale through the e-commerce channel;
    determining, for each of the plurality of encumbered item pages, a plurality of search terms that were input by a user as part of a query and that resulted in the encumbered item page being returned to the user as responsive to the query;
    training, based at least in part on the plurality of keywords and the plurality of search terms, a machine learning model, wherein training includes defining, based at least in part on the plurality of keywords and the plurality of search terms, a plurality of topics;
    determining, based at least in part on a keyword included in an item page of an electronic commerce ("e-commerce) channel and a search term included in a query that resulted in the item page being returned as responsive to the query, a total item risk score indicating a likelihood that the item page corresponds to a risky item, wherein the total item risk score is determined based at least in part on the machine learning model; and
    in response to determining that the total item risk score exceeds a threshold, removing the item page from the e-commerce channel so that the item corresponding to the item page cannot be purchased through the item page of the e-commerce channel.

2. The computer-implemented method of claim 1, wherein determining the total item risk score includes:
   determining a second plurality of keywords present in the item page;
   determining a second plurality of search terms that were input by a second user as part of a second query and that resulted in the item page being returned to the second user as responsive to the query;
   determining, based at least in part on the second plurality of the keywords and the second plurality of search terms, a probability score for a topic, the probability score indicating a likelihood that the item page corresponds to the topic; and
   wherein determining the total item risk score is based at least in part on the probability score.

3. The computer-implemented method of claim 2, further comprising:
   determining, for the topic, a topic risk score; and
   wherein the total item risk score is based at least in part on the topic risk score and the probability score.

4. The computer-implemented method of claim 1, wherein determining the total item risk score includes:
   determining, for at least one term of the plurality of keywords or the plurality of search terms, an occurrence count of the at least one term in at least one of a second plurality of keywords of the item page or a second plurality of search terms that were input by a second user as part of a second query and that resulted in the item page being returned to the second user as responsive to the query.

5. The computer-implemented method of claim 1, further comprising:
   subsequent to training, providing, to the machine learning model, a second item page from the e-commerce channel;
   determining, with the machine learning model, a second total item risk score indicating a second likelihood that the second item page corresponds to a second risky item; and
   in response to determining that the second total item risk score does not exceed the threshold, indicating the second item page as having a low risk of corresponding to the second risky item.

6. A computing system, comprising:
   one or more processors; and
   a memory storing program instructions that when executed by the one or more processors cause the one or more processors to at least:
      determine a plurality of keywords present in at least one of a plurality of encumbered item pages;
      determine, for each of the plurality of encumbered item pages, a plurality of search terms that were input as part of a respective query and that resulted in the encumbered item page being returned as responsive to the respective query;
      train, based at least in part on the plurality of keywords and the plurality of search terms, a machine learning model, wherein training includes defining, based at least in part on the plurality of keywords and the plurality of search terms, a plurality of topics;
      determine, based at least in part on a keyword included in an item page of an electronic commerce ("e-commerce") channel and a search term included in a query that resulted in the item page being returned as responsive to the query, a total item risk score indicative of a risk that an item corresponding to the item page is a risky item for which sale of the item through the e-commerce channel is to be encumbered, wherein the total item risk score is determined based at least in part on the machine learning model; and
      in response to a determination that the total item risk score exceeds a threshold, encumber the item page as corresponding to the risky item.

7. The computing system of claim 6, wherein the program instructions, when executed by the one or more processors to encumber the item page, further include instructions that, when executed by the one or more processors, further cause the one or more processors to at least:
   remove the item page from the e-commerce channel so that the item cannot be purchased through the item page.

8. The computing system of claim 6, wherein the program instructions when executed by the one or more processors to cause the one or more processors to determine the total item risk score, further include instructions that, when executed by the one or more processors, further cause the one or more processors to at least:
   determine, for each of the plurality of topics, a topic risk score;
   determine, for each of the plurality of topics, a probability score indicative of a probability that the item page corresponds to the topic; and
   determine, based at least in part on a highest probability score and a topic risk score corresponding to the topic that resulted in the highest probability score, the total item risk score.

9. The computing system of claim 6, wherein the program instructions when executed by the one or more processors to cause the one or more processors to determine the total item risk score, further include instructions that, when executed by the one or more processors, further cause the one or more processors to at least:
   determine, for each of the plurality of topics, a topic risk score;
   determine, for each of the plurality of topics, a probability score indicative of a probability that the item page corresponds to the topic;
   determine, for each of the plurality of topics and based at least in part on a respective probability score and a respective topic risk score, an item risk score for the item page and the topic; and
   determine, based at least in part on each item risk score, a cumulative item risk score.

10. The computing system of claim 9, wherein the program instructions when executed by the one or more processors to determine the total item risk score, further include instructions that, when executed by the one or more processors further cause the one or more processors to at least:
   determine, based at least in part on one or more of the cumulative item risk score, a highest item risk score, a sales history for the item, a number of views of the item page, a number of sellers of the item on the e-commerce channel, or a seller of the item on the e-commerce channel, the total item risk score.

11. The computing system of claim 9, wherein the program instructions when executed by the one or more processors to determine the topic risk score further include instructions that, when executed by the one or more processors, further cause the one or more processors to at least:

determine, for each of a plurality of terms associated with the topic, an occurrence count of the term in one or more encumbered item pages; and determine, based at least in part on the occurrence count of each of the plurality of terms, the topic risk score.

12. The computing system of claim 6, wherein the program instructions further include instructions that, when executed by the one or more processors, further cause the one or more processors to at least:

determine, with the machine learning model, a second total item risk score indicating a second likelihood that a second item page corresponds to a second risky item; and in response to a determination that the second total item risk score does not exceed the threshold, indicate the second item page as having a low risk of corresponding to the second risky item.

13. The computing system of claim 6, wherein the program instructions further include instructions that, when executed by the one or more processors, further cause the one or more processors to at least:

determine, with the machine learning model, a second total item risk score indicating a second likelihood that a second item page corresponds to a second risky item; and in response to a determination that the second total item risk score does not exceed the threshold, determine that the second total item risk score is above a low risk threshold; and in response to a determination that the second total item risk score is above the low risk threshold, provide the item page for manual review.

* * * * *